United States Patent [19]
Ozcelik et al.

[11] Patent Number: 5,928,321
[45] Date of Patent: Jul. 27, 1999

[54] TASK AND STACK MANAGER FOR DIGITAL VIDEO DECODING

[75] Inventors: Taner Ozcelik, Fremont; Shirish C. Gadre, San Jose, both of Calif.

[73] Assignees: Sony Corporation, Tokyo, Japan; Sony Electronics, Inc., Park Ridge, N.J.

[21] Appl. No.: 08/866,419

[22] Filed: May 30, 1997

[51] Int. Cl.$^6$ .................................................. G06F 13/00
[52] U.S. Cl. ................................................................ 709/1
[58] Field of Search ..................................................... 709/1

[56] References Cited

U.S. PATENT DOCUMENTS

| | | | |
|---|---|---|---|
| 5,499,370 | 3/1996 | Hosaka et al. | 395/672 |
| 5,528,513 | 6/1996 | Vaitzblit et al. | 395/673 |

OTHER PUBLICATIONS

IBM Corp., Masking Peripheral Interrupts, IBM Technical Disclosure Bulletin, vol. 24, No. 11A, Apr. 1982, pp. 5362–5363.

IBM Corp., IOP Task Switching, IBM Technical Disclosure Bulletin, vol. 33, no. 5, Oct. 1990, pp. 156–158.

Anzinger, George A., Managing PA–RISC Machines for Real–Time Systems, 1266 Hewlett–Packard Journal, 44(1993) Aug., No. 4, pp. 31–37.

Hills, Ted, Structured Interrupts, 8283 Operating Systems Review (SIGOPS) 27 (1993) Jan., No. 1, pp. 51–68.

IBM Corp., Asynchronous Task Scheduler, IBM Technical Disclosure Bulletin, vol. 14, No. 10, Mar. 1972, pp. 3192–3193.

*Primary Examiner*—David Y. Eng
*Attorney, Agent, or Firm*—Wood,Herron&Evans, L.L.P.

[57] ABSTRACT

A reduced instruction set CPU is programmed to provide software-controlled task management, a stack, and to manage virtual instruction memory. The CPU performs a task management procedure in which the CPU repeatedly checks task flags, and if a task flag is set, performs the task associated with the set task flag. If multiple task flags are set, the highest priority task of those associated with set task flags is performed. Whenever a subroutine call is needed, the subroutine call is implemented by calling a stack management routine. The stack management routine retrieves and stores a return address into a location in DRAM identified by a stack pointer, increments the stack pointer, and then executes a CALL instruction, causing program execution to sequence to the desired subroutine. At the end of each subroutine, a RETURN instruction is executed, in response to which, program execution returns to the stack management routine, and the stack management routine decrements the stack pointer, loads the previously-stored return address from a location in DRAM identified by the stack pointer register, and then causes program execution to sequence to the loaded return address. The stack management routine also provides virtual instruction memory management, by determining whether a routine is resident in the on-chip instruction memory available to the RISC CPU prior to calling or returning to the routine. If not, the virtual instruction memory management routine transfers the desired routine from off-chip DRAM into the on-chip instruction memory, and then executes the call or return.

14 Claims, 5 Drawing Sheets

TASK AND STACK MANAGER FOR DIGITAL VIDEO DECODING

FIELD OF THE INVENTION

The present invention relates to methods for controlling a reduced instruction set processor for digital video processing.

BACKGROUND OF THE INVENTION

Techniques for digital transmission of video promise increased flexibility, higher resolution, and better fidelity. Recent industry collaborations have brought digital video closer to reality; digital video transmission and storage standards have been generated, and consumer digital video products have begun to appear. The move toward digital video has been encouraged by the commercialization of digital technologies in general, such as personal computers and compact discs, both of which have increased consumer awareness of the possibilities of digital technology.

Personal computers, which have recently become common and inexpensive, contain much of the computing hardware needed to produce digital video, including a microprocessor/coprocessor for performing numeric calculations, input and output connections, and a large digital memory for storing and manipulating image data. Unfortunately, personal computers are not suitable for consumer digital video reception, because the microprocessor in a personal computer is a general purpose processor, and typically cannot perform the calculations needed for digital video fast enough to produce full-motion, high definition video output.

Accordingly, special purpose processors, particularly suited for performing digital video-related calculations, have been developed for use in digital video receivers for consumer applications. A specific processor of this kind is disclosed in commonly-assigned, copending U.S. patent application Ser. No. 08/865,749, entitled SPECIAL PURPOSE PROCESSOR FOR DIGITAL AUDIO/VIDEO DECODING, filed by Moshe Bublil et al. on May 30, 1997, which is hereby incorporated by reference herein in its entirety, and a memory controller for use therewith is disclosed in commonly-assigned, copending U.S. patent application Ser. No. 08/846,590, entitled "MEMORY ADDRESS GENERATION FOR DIGITAL VIDEO", filed by Edward J. Paluch on Apr. 30, 1997, which is hereby incorporated herein in its entirety.

The above-referenced U.S. patent applications describe an application specific integrated circuit (ASIC) for performing digital video processing, which is controlled by a reduced instruction set CPU (RISC CPU). The RISC CPU controls computations and operations of other parts of the ASIC to provide digital video reception. As is typical of CPU's of many varieties, the CPU described in the above-referenced U.S. patent applications supports flow control instructions such as BRANCH, CALL and RETURN, as well as providing hardware interrupt services.

However, as is typical of RISC CPU design, for simplicity and savings of chip area, the functionality of the RISC CPU described in the above noted U.S. patent applications is limited in several ways. First, the RISC CPU does not include any support for a stack, and thus cannot support nested procedures calls, or nested interrupts. Whenever a CALL instruction is executed, the return address for that call is stored in a single on-chip register. If another CALL instruction is executed, the previous return address is lost, and an error will result. Whenever an interrupt occurs, the RISC CPU branches to the associated interrupt service routine, and ignores all other interrupts until a RETURN is encountered at the end of the interrupt service routine.

A second limitation of the RISC CPU described in the above-referenced U.S. patent applications, is the size of the instruction memory available to the CPU. As described in the applications, the instruction memory is limited to 4096 instructions, which is a relatively small space; however, in some lower-density applications, the instruction memory might be further limited, for example to 2048 or fewer instructions, in order to conserve chip area.

These limitations of the RISC CPU described in the above-referenced U.S. patent applications, present difficulties in programming the RISC CPU for digital video decoding. Firstly, it is preferable to write software for a CPU in a modular fashion, such that those portions of the software that are used repeatedly, are incorporated into subroutines that can be called from other locations in the program. This approach reduces the total number of instructions in the program by making repeated use of common sets of instructions. Unfortunately, to take full advantage of this approach, it is often necessary to nest procedure calls, i.e., to permit subroutines to call other subroutines. If procedure calls cannot be nested, as is the case in the RISC CPU described in the above-referenced U.S. patent applications, it can be difficult to write software in an efficient, modular fashion.

Furthermore, it can be difficult to provide sufficient digital audio/video decoding functionality in a program which is limited to 2048 or even 4096 instructions. Thus, the small size of the instruction memory provided by the RISC CPU of the above-referenced U.S. patent applications presents a serious limitation on the functionality that can be provided.

Finally, difficulties arise from the nature of digital video processing. Digital video decoding involves a wide variety of digital processing tasks, some of which are time-critical (such as video "slice" decoding for display) and some of which are substantially less time critical (such as on-screen display and subtitle processing). As to time-critical tasks, the RISC CPU must detect when processing is needed and instruct other elements of the ASIC to respond appropriately, and must do so in a timely fashion.

One approach to providing this functionality, would be to associate each decoding task with an interrupt; when certain processing is needed, the associated interrupt is delivered to the CPU, causing the CPU to respond by branching to the associated interrupt service routine, and thereby performing the necessary actions. Unfortunately, when used in the RISC CPU described in the above-referenced U.S. patent applications, this approach could fail to provide the required responsiveness to time-critical tasks, because that RISC CPU does not permit nesting of interrupts. As one example of the problems that could occur, an interrupt for a non-time-critical task, might be delivered to the CPU just prior to an interrupt for a time-critical task. If this occurs, and if the interrupt service routine of the non-time-critical task is relatively lengthy, servicing of the time-critical task might be unacceptably delayed, since during the interrupt service routine for the non-time-critical task, no further interrupts will be serviced.

SUMMARY OF THE INVENTION

In accordance with principles of the present invention, these difficulties are overcome by a novel method for controlling the RISC CPU which provides task management—enabling rapid response to time-critical interrupts; and provides for stack management—enabling nested procedure calls allowing fully modular software structures; and provides virtual instruction memory management—to provide an effectively unlimited virtual instruction space.

Specifically, in accordance with a first aspect, the invention provides a method of controlling a RISC CPU to provide management of tasks to be performed by the CPU. Tasks to be handled by the CPU are identified by binary task flags in a register of the CPU. The CPU performs a task management procedure in which the CPU repeatedly checks these task flags, and if a task flag is set, performs the task associated with the set task flag. If multiple task flags are set, the highest priority task of those associated with set task flags is performed.

In specific embodiments of this aspect of the invention, the task manager searches the flags in accordance with a recursive search procedure. Specifically, a group of flags is simultaneously checked to determine if any are set. If none or set, subsequent groups of flags are checked in a similar manner. If any flags are determined to be set, smaller subgroups of the group of flags are simultaneously checked to determine if any are set. This process repeats, checking increasingly smaller subgroups of flags, until finally, the location of the set flag is identified.

Tasks are scheduled in response to interrupts delivered to the RISC CPU. Specifically, when a processing task needs to be performed, an interrupt is delivered to the RISC CPU. In response to the interrupt, the CPU performs an interrupt service routine, and in this routine, one or more of the task flags may be set. Thereafter, upon conclusion of the interrupt, the set task flag will cause the task management procedure to perform the associated task.

The most time critical tasks can be provided special priority, by incorporating the necessary processing steps for the task, into an interrupt service routine. If this is done, once this interrupt service routine is initiated in response to the associated interrupt, processing of the task will commence immediately, and will not be stalled.

In a second aspect, the present invention provides a method of controlling a RISC CPU to provide stack management, using an allocated area of off-chip dynamic random access memory (DRAM). Specifically, whenever a subroutine call is needed, the subroutine call is implemented by storing the address of the subroutine in a temporary register, and then executing a CALL instruction causing program execution to sequence to a stack management routine. The stack management routine retrieves the return address associated with the CALL instruction from a register of the RISC CPU, stores this return address into a location in DRAM identified by a stack pointer register in the RISC CPU, increments the stack pointer, and then executes a CALL instruction, causing program execution to sequence to the desired subroutine. At the end of each subroutine, a RETURN instruction is executed, which as a result of the foregoing, causes program execution to return to the stack management routine at the instruction following the previously-executed CALL instruction. After this RETURN, the stack management routine decrements the stack pointer, loads the previously-stored return address from a location in DRAM identified by the stack pointer register, and then executes a BRANCH instruction, causing program execution to sequence to the loaded return address. The use of a stack management routine in this manner, permits any number of subroutine calls to be nested within each other; in response to nested subroutine calls, return addresses are accumulated in the DRAM stack, for later retrieval in the appropriate order.

In a third aspect, the present invention provides a method of controlling a RISC CPU to provide virtual instruction memory management, using an allocated area of off-chip DRAM. Specifically, whenever a subroutine call is needed, the subroutine call is implemented in the above-described manner, by storing the address of the subroutine in a temporary register, and then executing a CALL instruction causing program execution to sequence to a virtual instruction memory management routine, which can be part of the stack management routine described above, or could be implemented separately if the CPU provides hardware stack management. The virtual instruction memory management routine determines whether the desired subroutine is resident in the on-chip instruction memory available to the RISC CPU. If not, the virtual instruction memory management routine transfers the desired subroutine from off-chip DRAM into the on-chip instruction memory. Thereafter, the virtual instruction memory management routine executes a CALL instruction, causing program execution to sequence to the desired subroutine.

In the specific disclosed embodiment of this aspect of the present invention, as part of transferring the desired subroutine from off-chip DRAM into the on-chip instruction memory, the RISC CPU determines the number of instructions in the subroutine, and transfers only this number of instructions from off-chip DRAM into the on-chip instruction memory.

The virtual instruction memory management routine also, where necessary, computes a physical memory address of the desired subroutine, and causes program execution to sequence to the computed physical memory address. In this specific embodiment, some of the subroutines of the software for the CPU are permanently stored in the instruction memory, e.g., interrupt service routines and time-critical processing subroutines. At any given time, one of the remaining non-permanent subroutines is stored in the instruction memory, in a "non-resident" area of the instruction memory. As a result, the physical memory address of the first instruction of a non-permanent subroutine is always equal to the first address in this non-resident area of the instruction memory.

To keep track of which subroutine is stored in the non-resident area of the instruction memory, when a subroutine is swapped into instruction memory, the virtual memory address of the first instruction of the subroutine is stored in a register of the CPU. If a non-permanent subroutine is called, the virtual address of the called subroutine is compared to the virtual instruction memory address stored by the CPU. If the two are equal, this indicates that the desired subroutine is already resident in the instruction memory, and the step of swapping the subroutine into instruction memory is skipped, thus increasing the performance and reducing latency, both of which are critical in real-time control applications.

The above and other aspects, objects and advantages of the present invention shall be made apparent from the accompanying drawings and the detailed description thereof.

BRIEF DESCRIPTION OF THE DRAWING

The accompanying drawings, which are incorporated in and constitute a part of this specification, illustrate embodiments of the invention and, together with the general description of the invention given above, and the detailed description of the embodiments given below, serve to explain the principles of the invention.

DETAILED DESCRIPTION OF SPECIFIC EMBODIMENTS

Figure 1:
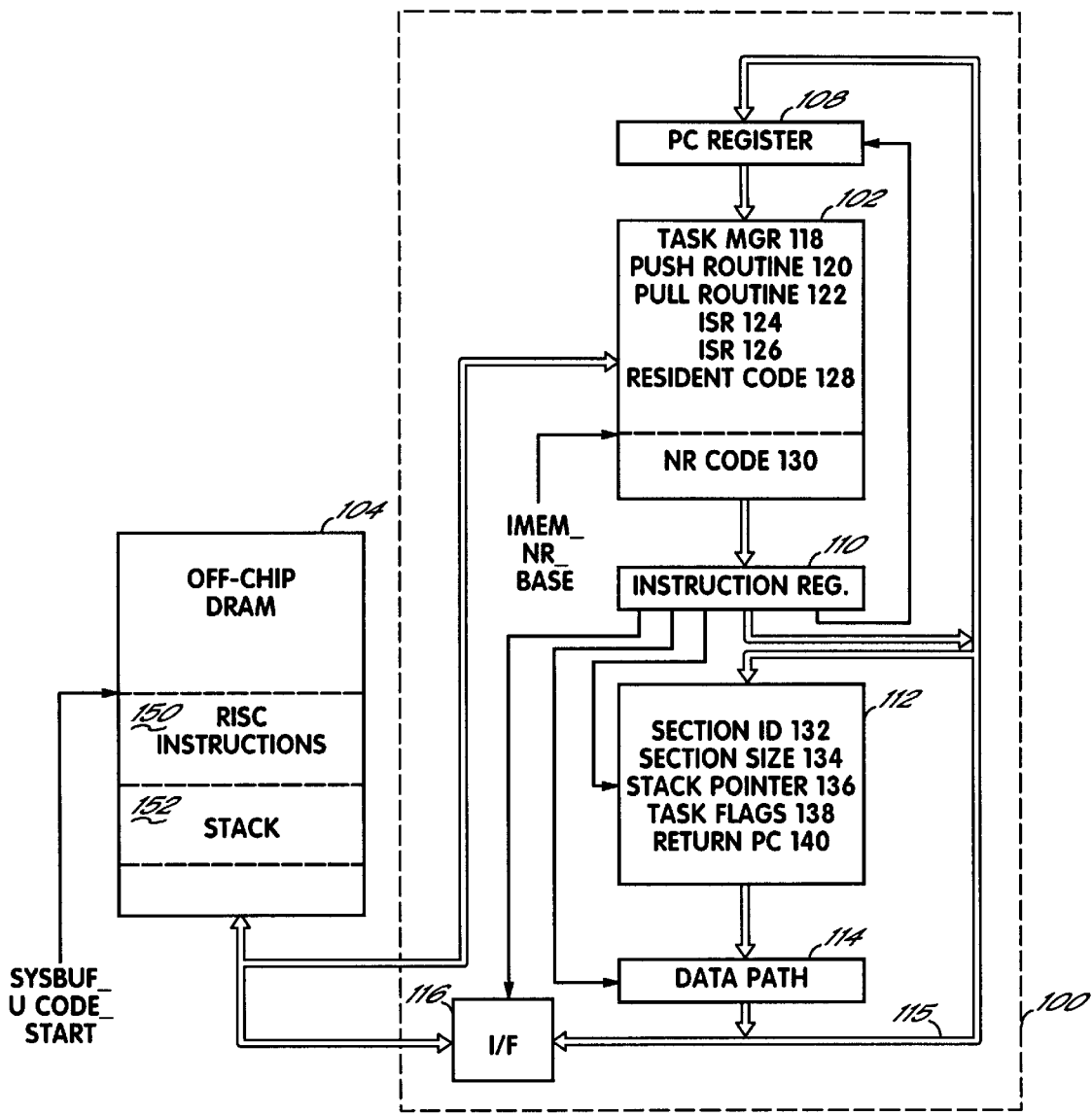
FIG. 1 is a block diagram of specific components of the application specific integrated circuit (ASIC) described in the above-referenced U.S. patent applications, showing in particular the off-chip dynamic random access memory (DRAM) and the data stored therein, the reduced instruction set central processing unit (RISC CPU) for controlling the ASIC, and components of the RISC CPU and the data stored therein.

Referring to FIG. 1, the general structure of an ASIC, including a RISC CPU 100 for controlling digital audio/video decoding by the ASIC, can be discussed. The detailed structure of the RISC CPU 100 and of elements of the ASIC is described in the above-referenced U.S. patent applications. For present purposes, only a few specifically relevant components of the RISC CPU of the ASIC will be discussed.

Specifically, the RISC CPU 100 includes an instruction memory 102 for storing instructions to be executed by the RISC CPU 100 in order to control digital audio/video processing performed by the ASIC. These instructions are initially loaded into instruction memory 102 from an off-chip dynamic random access memory (DRAM) 104, via a data bus 106 connected between DRAM 104 and the ASIC.

The address of an instruction in instruction memory 102 to be executed by the RISC CPU, is identified by a program counter (PC) register 108. The instruction read from instruction memory 102 is delivered to an instruction register 110, and used to control operations of the RISC CPU. As described in the above-referenced U.S. patent applications, instructions are 16-bits wide, and control a wide variety of operations of the RISC CPU, including operations of a register file 112, a data path 114, a memory interface 116, and other elements described in the above-referenced U.S. patent applications.

The program of instructions found in instruction memory 102 includes various routines, which are generally illustrated in FIG. 1. Specifically, a task manager routine 118 residing in instruction memory 102 (and discussed in further detail below with reference to FIG. 3B), is repeatedly executed during operation of the ASIC. Task manager routine 118 interacts with flags in a register of register file 112, to schedule and execute any of a number of tasks to perform needed audio/video processing.

Also included in instruction memory 102, is a stack and virtual instruction memory management routine, consisting of a PUSH routine 120 (further described below with reference to FIG. 4A), and a PULL routine 122 (further described below with reference to FIG. 4B). These routines are executed upon any subroutine call performed by the task handler, any specific task or any interrupt service routine, and interact with an allocated region of DRAM 104 to provide virtual instruction memory management and permit nesting of subroutine calls.

Instruction memory 102 further includes several interrupt service routines such as 124 and 126. As noted earlier, these routines are activated by hardware of the RISC CPU upon receipt of an interrupt. As illustrated in further detail with reference to FIG. 3A, the interrupt service routine performs necessary audio/video processing control, and/or may set a task flag to cause an associated task to be scheduled by the task manager routine 118.

Instruction memory 102 also includes other resident routines such as 128, including routines for carrying out tasks scheduled by task manager 118, or subroutines called by tasks or interrupt service routines as part of processing.

All of the foregoing routines are permanently resident in instruction memory 102, that is, these routines are transferred into instruction memory 102 when the ASIC is initially booted, and are thereafter left unchanged. There is, however, an area of instruction memory 102 which may contain one of several "non-resident" routines, which are swapped into instruction memory 102 as needed during execution of a program by the RISC CPU. Specifically, at any given time, one of several "non-resident" routines 130 is stored in an allocated "non-resident" area of instruction memory 102. The "non-resident" area of instruction memory 102 is that area of the instruction memory located at addresses greater than the fixed address IMEM_NR_BASE. Instructions are loaded into the "non-resident" area of instruction memory 102 when those instructions are required for execution of a task or interrupt service routine, on an as-needed basis. The swapping is controlled through execution of the PUSH and PULL routines 120 and 122, as described below in detail with reference to FIGS. 4A and 4B.

Among the elements of the RISC CPU which are controlled by instructions, is a register file 112. Register file 112 includes a number, e.g., sixty-four, 32-bit registers which are used by RISC CPU 100 in performing calculations for audio/video digital signal decoding and processing. A few specific registers used by RISC CPU 100 as part of virtual instruction memory and stack management, are illustrated in FIG. 1 and will be discussed below.

A first register in register file 112 is the SectionID register 132, which stores data identifying which of several "non-resident" routines is stored in area 130 of instruction memory 102. This register is used in virtual memory management to determine whether a routine must be swapped into instruction memory 108, as discussed below with reference to FIGS. 4A and 4B.

A second register in register file 112 is the SectionSize register 134, which stores data identifying the size of the current nonresident routine stored in area 130 of instruction memory 102. This register is used in virtual memory management to swap the appropriate number of instructions from DRAM 104 to instruction memory 102, and no more, thus minimizing the latency caused by swapping.

A third register in register file 112 is the StackPointer register 136, which identifies a location in the stack in DRAM 104 to which data should be written or from which data should be read as part of the stack management PUSH and PULL routines 120 and 122, discussed below with reference to FIGS. 4A and 4B.

A fourth register in register file 112 is the TaskFlags register 138, which stores the flags used in scheduling tasks for execution as part of the task management routine 118, discussed below with reference to FIG. 31B.

A fifth register in register file 112 is the ReturnPC register 140, which stores a return address when a CALL instruction is executed by RISC CPU 100. Whenever a CALL instruction is executed by RISC CPU 100, the RISC CPU automatically stores the address of the instruction in instruction memory 102 immediately following the CALL instruction, into ReturnPC register 140. The address stored in ReturnPC register 140 is manipulated as part of the stack management PUSH and PULL routines 120 and 122, discussed below with reference to FIGS. 4A and 4B, in order to provide a stack enabling nested subroutine calls.

Data path 114 in RISC CPU 100 responds to instructions generated from an instruction in instruction register 110, by performing arithmetic or logical operations on the contents of registers delivered from register file 112, and delivering the results of these computations to a data bus 115. The specific arithmetic or logical operation performed by data path 114 is determined by the opcode portion of the instruction in instruction register 110, as is described in substantially greater detail in the above-referenced U.S. patent applications.

The output of data path 114, which is schematically identified in FIG. 1 as a bus 115, is connected to an input of register file 112, allowing the results of arithmetic or logical computations performed by data path 114 to be stored into registers of register file 112. Furthermore, bus 115 is connected to memory interface 116, permitting the results of logical operations performed by data path 114 to be stored into DRAM memory 104, and further permitting data stored in DRAM memory 104 to be retrieved to bus 115 and stored, for example, into a register of register file 112.

The output of data path 114 can also be delivered to PC register 108, permitting a CALL or BRANCH instruction to directly load an address of an instruction in instruction memory 102, into PC register 108, thus causing program execution to sequence to the new address. For this purpose, there is also a connection from instruction register 110 to bus 115, permitting immediate values in an instruction to be delivered to PC register 108 as part of a CALL or BRANCH instruction, and permitting immediate values in an instruction to be delivered to a register of register file 112.

The foregoing hardware structure is described in schematic fashion, for the purpose of illustrating the operation of the routines described in the following figures. The above-referenced U.S. patent applications describe these hardware structures in substantially greater detail, and in particular identify the instructions and specific paths of data flow provided by the RISC CPU.

As noted above, instructions are loaded into instruction memory 102 from DRAM 104 via bus 106. The instructions are stored in DRAM 104 in an allocated region 150 of DRAM memory 104. This allocated region, which stores for example at least 4096 32-bit instructions, begins at a base DRAM memory address SYSBUF_UCODE_START. Each subroutine used by RISC CPU 100 begins at a virtual instruction memory address, which is the location of the first instruction of the subroutine in the DRAM region 150, relative to the SYSBUF_UCODE_START address. Those subroutines with virtual instruction memory addresses which are less than IMEM_NR_BASE, are permanently stored in instruction memory 102. Subroutines with virtual instruction memory addresses greater than IMEM_NR_BASE are swapped into the nonresident portion 130 of instruction memory 102 on an as-needed basis.

When the ASIC is first booted, those instructions in DRAM 104 with virtual instruction memory addresses less than IMEM_NR_BASE, are loaded from region 150 of DRAM 104 into the permanent area of instruction memory 102. Thereafter, as part of execution of the virtual instruction memory management PUSH and PULL routines 120 and 122, additional "non-resident" subroutines are loaded from region 150 of DRAM 104 into the non-resident area 130 of instruction memory 102, as discussed below with reference to FIGS. 4A and 4B.

DRAM memory 104 also includes an allocated region 152 for storing a stack. As discussed in greater detail below, stack region 152 stores data necessary for performing nested subroutine calls, specifically, this region stores return addresses as well as data identifying non-resident subroutines needed to continue processing after a CALL instruction. The value in the StackPointer register 136 identifies a location in the stack region 152 of memory 104.

Figure 2A:
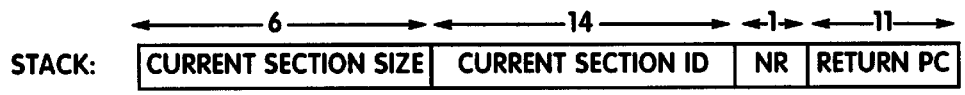
FIG. 2A is a data structure diagram of one entry in the DRAM stack illustrated in FIG. 1, showing the data stored therein.

Referring now to FIG. 2A, the specific format of data stored in the stack region 152 of DRAM 104, can be described.

Each entry in the stack includes a 6-bit current SectionSize value, which identifies the number of instructions in any non-resident subroutine that was stored in the non-resident portion 130 of the instruction memory at the time that a CALL instruction was executed and the stack entry was stored in the stack by the PUSH routine 120. This 6-bit value is used by the PULL routine 122, if the PULL routine determines that it is necessary to swap the non-resident subroutine back into the non-resident portion 130 of the instruction memory to continue processing of instructions after the CALL.

Each stack entry also includes a 14-bit current SectionID value, which identifies the virtual instruction memory address of the non-resident subroutine that was stored in the non-resident portion 130 of the instruction memory at the time that a CALL instruction was executed and the stack entry was stored in the stack by the PUSH routine 120. This 14-bit value is used by the PULL routine 122, if the PULL routine determines that it is necessary to swap the non-resident subroutine back into the non-resident portion 130 of the instruction memory to continue processing of instructions after the CALL.

Each entry in the stack further includes a single bit NR, which identifies whether the CALL instruction which caused the PUSH routine 120 to store an entry on the stack, was in a non-resident routine. The NR flag is used by the PULL routine to determine whether the instructions after the CALL are in a non-resident routine, and thus determine whether the non-resident routine that was in memory at the time the CALL instruction was executed, must be in memory to continue processing of instructions after the CALL.

Each entry in the stack finally includes an 11-bit value ReturnPC, which identifies the physical instruction memory address of the instruction immediately following the CALL instruction which caused the PUSH routine 120 to store an entry on the stack. The PULL routine 122 uses the ReturnPC value to cause program execution to sequence to the instruction immediately following the CALL instruction.

Figure 2B:
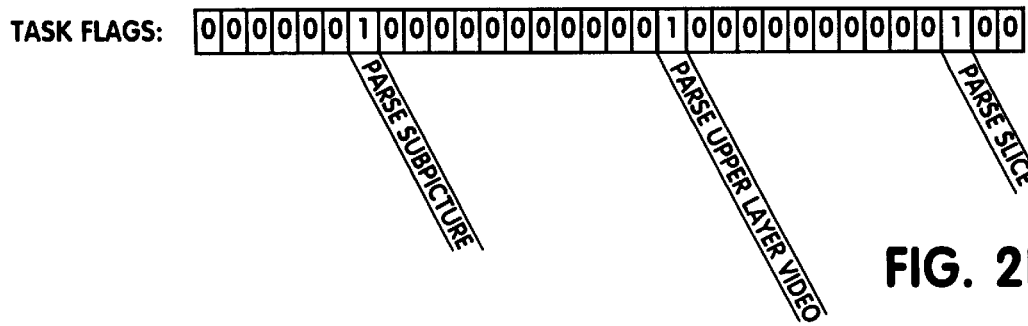
FIG. 2B is a data structure diagram of the task flags stored in one of the registers of the RISC CPU illustrated in FIG. 1, showing the data stored therein.

Referring now to FIG. 2B, the specific structure of the TaskFlags register 138 can be described. This register includes thirty-two single-bit flags. As noted above and elaborated below, to schedule execution of a task, one of the bits of this register are set, thereby causing the task manager 118 to execute the corresponding task. The bits in register 138 are in order of priority of the tasks; higher priority tasks are positioned in lower-order bits of the task register. Thus, for example, one of the lower-order bits might be associated with a parse_slice task, which is a relatively time-critical activity in digital audio/video decoding, involving the parsing of a "slice" of video. A higher-order bit might be associated with a parse_upper_layer_video task, which is a less time critical activity in digital audio/video decoding, involving the parsing of headers of packets of digital information. An even higher order bit might be associated with a parse_subpicture task, which is a low priority task in digital audio/video decoding, involving parsing of information for generating subpicture video information.

Figure 3A:
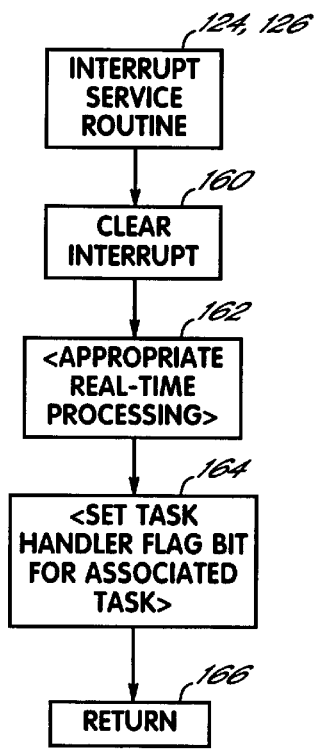
FIG. 3A is a flow chart of a typical interrupt service routine included in the permanent storage area of the instruction memory of the RISC CPU illustrated in FIG. 1.

Referring now to FIG. 3A, an interrupt service routine such as 124 or 126, includes a first step 160 in which the interrupt flag for the service routine is cleared, so that a subsequent interrupt of the same type can be delivered to the RISC CPU. Next, in step 162, any number of appropriate real-time processing steps may be performed. As noted above, for relatively high-priority real-time control tasks, various real-time processing steps may be incorporated into the interrupt service routine, rather than included in a task scheduled by the task manager. This may be necessary for those tasks that cannot tolerate latency, such as many low-level video decoding operations. After any steps 162, the interrupt service routine may include a step 164, in which one of the task handler flag bits is set in order to schedule a task for subsequent execution. As noted, lower priority tasks include relatively straightforward interrupt service routines, which simply set a task flag and return. Other routines may perform certain time critical operations in step 162, and then set a task flag in step 164 to schedule other, less time critical tasks. Still other routines might perform all operations in step 162, and not schedule any operations with the task manager in step 164. In any case, after steps 160, 162 and 164, a RETURN instruction at the end of the interrupt service routine terminates servicing of the interrupt.

Figure 3B:
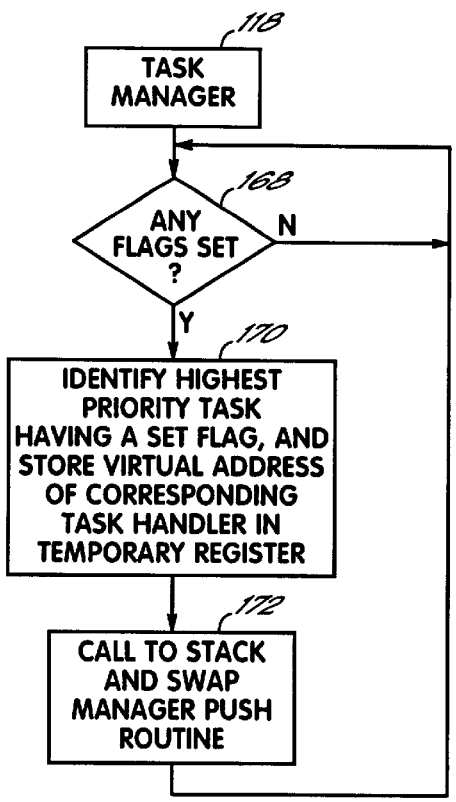
FIG. 3B is a flow chart of the task manager included in the permanent storage area of the instruction memory of the RISC CPU illustrated in FIG. 1.

Referring to FIG. 3B, the task manager 118 includes a number of steps for responding to the scheduling of tasks by previously-executed interrupt service routines. Specifically, the task manager executes a continuous loop, the first step 168 of which determines whether any of the task flags is set. If no flags are set, the task manager 118 will continually re-execute step 168 until a flag is set by an interrupt service routine. Once a flag is set, the task manager 118 will proceed from step 168 to step 170, in which the task manager determines which task flag is set.

It will be appreciated that multiple task flags might be set at any time, such as is illustrated for example in FIG. 2B. In such a situation, task manager 118 services the tasks in accordance with a prioritization. As discussed above, the higher priority tasks are associated with lower-order bits of the task flag register. Accordingly, in step 170, task manager 118 scans the task bits in the task flag register, beginning with the least significant bit, attempting to locate the set task flag associated with the highest priority task. (Details of this operation are discussed below in connection with FIG. 3D.) Ultimately, the highest priority set bit is found, and the task manager responds to this bit by identifying the virtual instruction memory address of the first instruction of the associated task handler. This virtual address is stored in a temporary register. Next in step 172, the task manager executes a CALL instruction, causing execution to sequence to the stack and swap manager PUSH routine 120. As discussed in detail below, the stack and swap manager uses the virtual instruction memory address stored in the temporary register to commence execution of the desired task handler. After step 172, the task manager returns to step 168 to search for another set task flag.

Figure 3C:
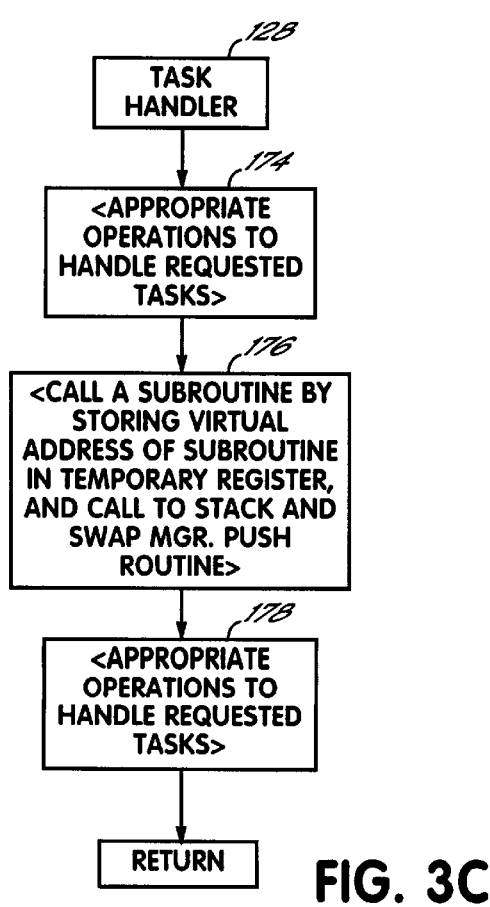
FIG. 3C is a flow chart of a typical task handler routine included in the permanent storage area of the instruction memory of the RISC CPU illustrated in FIG. 1.

Referring to FIG. 3C, a typical task handler 128 that is activated by task manger 118 can be discussed. A typical task handler includes a step 174 in which appropriate operations for carrying out the requested task are executed. This may include mathematical operations using the RISC CPU datapath, communications with functional units of the ASIC, or interaction with DRAM memory. In addition to such operations, a task handler may also include a step 176 in which the task handler calls a subroutine of instructions, for example to perform a common communication or memory management task. To call a subroutine, the task handler stores the virtual instruction memory address of the first instruction of the desired subroutine into a temporary register, and then executes a CALL instruction, causing execution to sequence to the stack and swap manager PUSH routine 120. The PUSH routine then causes execution to sequence to the desired subroutine. After the subroutine call, a step 178, including additional operations, may be included in the task handler, for example, using data generated by the subroutine called in step 176. A task handler may include any number of such task-related instructions or subroutine calls, in any desired order. The PUSH and PULL routines 120 and 122 ensure that a virtually unlimited number of subroutine calls can be performed in a task handler without concern for nesting of subroutine calls, and without concern for whether called subroutines are in the permanently resident portion of the instruction memory 102 or alternatively must be swapped into the nonresident portion of instruction memory 102 to locations above the address IMEM_NR_BASE.

Figure 3D:
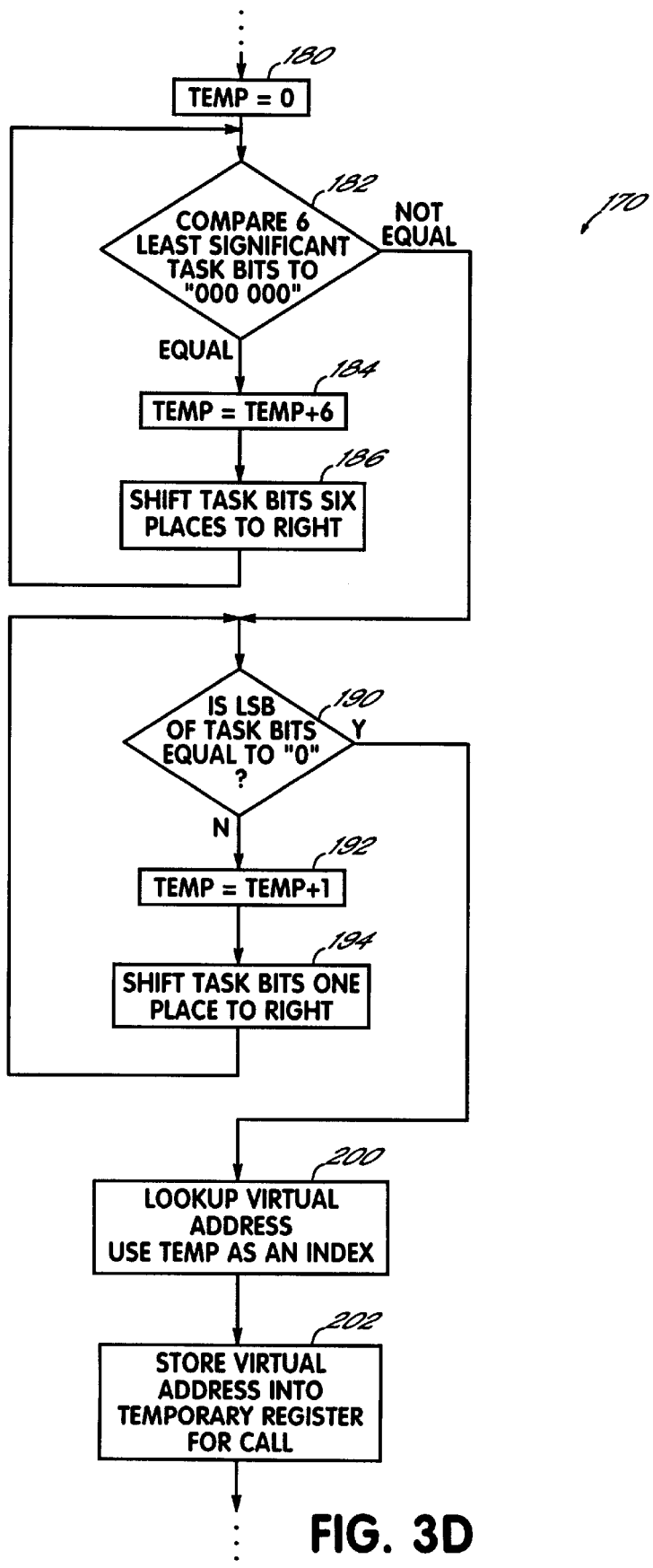
FIG. 3D is a flow chart of the task flag search procedure used by the task manager illustrated in FIG. 3B.

Referring now to FIG. 3D, the method used by the task manager to identify the highest priority task having a set flag can be detailed. As illustrated in FIG. 2B, there are 32 task flags, stored in a 32-bit register of the RISC CPU 100. These task flags are ordered, from the highest to lowest priority. Once task manager 118 determines that there is a set flag in this register (which is determined by comparing the entire register to zero using the BZ instruction provided by RISC CPU), task manager 118 follows a fast search procedure to locate the set task flag. This procedure evaluates the task flags in groups, to first locate the highest-priority group having a set task flag. Next, individual flags in the group are evaluated to identify the highest-priority set task flag in the group.

In a first step 180, a temporary register in RISC CPU 100 is initialized to a value of zero. The value in this register is updated to indicate the number of the task having the set task flag. Next, in step 182, the least significant six bits in the task flag register are compared to the binary value "000000"; essentially, this determines whether any of the bits zero through five of the task flag register 138 (the six least significant task flags) are set. If none of the six least significant task flags are set, then in step 184, the value in the temporary register is incremented by six, indicating that the next group of bits tested will be bits six through eleven. Then, in step 186, the task flag bits are shifted six places to the right, thus positioning bits six through eleven of the task flag register 138 in the six least significant places. Processing then returns to step 182, in which bits six through eleven of the task flag register are compared to the value "000000".

This loop continues, until in step 182, a group of bits has one or more task flag set. At this point, processing proceeds from step 182 to step 190. In step 190, the task manager determines whether the least significant bit (LSB) of the task flags is equal to "0". If so, then the set task flag associated with the highest priority task has been found. However, if the LSB of the task flags is not "0", then in step 192, the value in the temporary register is incremented by one, indicating that the next bit is being tested. Then, in step 194, the task flag bits are shifted one place to the right. Finally, step 190 is repeated, to again test the LSB of the task flag bits to "0".

These steps repeat in this manner, until in step 190, a task flag bit has a "1" value. At this point, the set task flag associated with the highest priority task has been found, and the number of the bit is stored in the temporary register. Accordingly, in step 200, the contents of the temporary register is used as an index to lookup the virtual address of the associated task handler from a table permanently stored in instruction memory 102. In step 202, the virtual address obtained from the table, is then stored into the appropriate temporary register so that subsequent step 172 of the task manager will call the appropriate task handler.

Figure 4A:
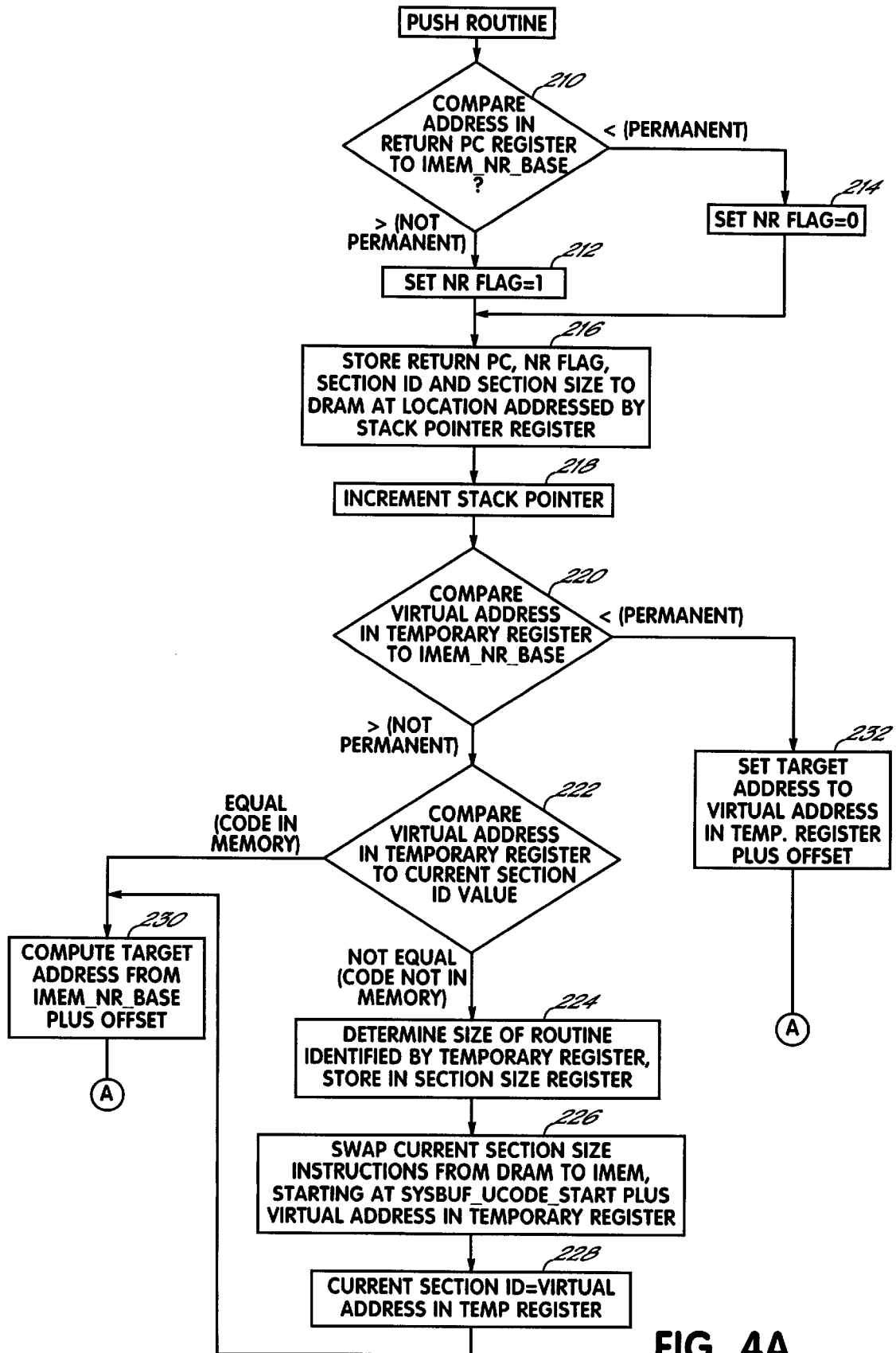
FIG. 4A is a flow chart of the virtual instruction memory and stack management routine included in the permanent storage area of the instruction memory of the RISC CPU illustrated in FIG. 1, and particularly the PUSH routine portion thereof.

Referring now to FIG. 4A, the virtual instruction memory and stack manager PUSH routine can be more fully described. This routine begins with a step 210, in which the value IMEM_NR_BASE, is compared to the return address found in the ReturnPC register 140. The return address in the ReturnPC register 140 contains the instruction memory address of the instruction after the CALL which activated the PUSH routine; if this address is greater than IMEM_NR_BASE, this indicates that the calling routine is in the nonresident area of the instruction memory, and processing proceeds to step 212 in which a flag "NR" is set to "1"; if the return address is less than IMEM_NR_BASE, then the calling routine is in the permanent area of the instruction memory, and processing proceeds to step 214, in which the NR flag is set to "0". The NR flag contains important information, used by the PULL routine. Specifically, the PULL must know whether a nonresident routine must be loaded into the instruction memory prior to returning execution to the return address; the NR flag supplies this information.

After step 212 or 214, processing proceeds to step 216, in which the current value in the ReturnPC register, the current value of the NR flag, the current value of the SectionID register, and the current value of the SectionSize register, are concatenated together in the format shown in FIG. 2A, and stored in DRAM 104 at the location identified by the StackPointer register. This step "pushes" the stack with the return address and related information, for later retrieval. Thereafter, in step 218, the value in the StackPointer register 136 is incremented, so that the stack is ready to receive data in the next "push".

After pushing data onto the stack, the PUSH routine prepares to call the desired subroutine identified by the calling routine. First, the PUSH routine must determine if the desired routine is in the permanent area of the instruction memory 102, or alternatively is a nonresident routine. To determine this, in step 220, the PUSH routine compares the virtual instruction memory address stored in the temporary register by the calling routine, to the IMEM_NR_BASE value.

If the virtual address in the temporary register is greater than IMEM_NR_BASE, this indicates that the desired subroutine is a "nonresident" routine, and may not be present in the instruction memory. In such a situation, processing proceeds to step 222, in which the virtual address in the temporary register is compared to the current value in the SectionID register. Since the SectionID register always contains the virtual instruction memory address of the nonresident routine stored in the nonresident area of the instruction memory, if the virtual address of the desired subroutine is not equal to the SectionID register, this indicates that the desired subroutine is not currently in the nonresident area of instruction memory 102.

In this circumstance, processing proceeds to step 224, where the PUSH routine prepares to swap the desired subroutine into the nonresident area of the instruction memory 102. Specifically, the swap routine first determines the size of the desired subroutine, and stores this size into the SectionSize register 134. The size of each subroutine may be stored in a number of ways, such as in a table found in the permanent or nonresident portions of the RISC CPU program. In the specific embodiment discussed herein, however, the size of each subroutine is stored in the subroutine itself, at a fixed offset (e.g., eight instructions) from the first instruction of the subroutine. This approach permits individual subroutines to be reassembled separately from the remainder of the program. In this embodiment, therefore, step 224 comprises loading, from the DRAM location which is eight instructions into the desired subroutine, the number of instructions in the subroutine, and storing this number in the SectionSize register 134.

After step 224, in step 226, the actual swap of instructions to the instruction memory 102 is performed. Specifically, the RISC CPU delivers a command to the memory controller of the ASIC, to swap the number of 32-bit instructions identified by the SectionSize register, into the instruction memory 102 at locations starting at IMEM_NR_BASE, from DRAM 104, starting at the DRAM address which is equal to the virtual instruction memory address stored in the temporary register by the calling routine, incremented by the offset value SYSBUF_UCODE_START. In response to this command, as described in detail by the above-referenced U.S. patent applications, the memory controller of the ASIC delivers SectionSize instructions to instruction memory 102, which are stored therein.

After step 226, a new subroutine has been stored in the nonresident area of instruction memory 102. Accordingly, in step 228, the virtual instruction memory address stored in the temporary register by the calling routine, is stored in the SectionID register 132, thus indicating that this subroutine is now in the nonresident portion of the instruction memory 102.

After step 228, the PUSH routine proceeds to step 230, in which it computes the physical memory address of entry point into the desired subroutine in instruction memory 102, in preparation for executing the desired subroutine. If in step 222, it is determined that the desired nonresident subroutine is in the nonresident portion of the instruction memory, processing also proceeds directly to step 230.

In either case, in step 230, the desired subroutine is a nonresident subroutine. Therefore, the location of the subroutine is IMEM_NR_BASE, i.e., it is located at the beginning of the nonresident portion of the instruction memory 102. Accordingly, the physical instruction memory address for the entry point of the routine is generated using IMEM_NR_BASE, rather than the virtual instruction memory address of the routine.

As discussed above, the calling routine stores the virtual instruction memory address of the desired subroutine into a temporary register before calling the PUSH routine 120. At the same time, the calling routine can identify an entry point into the desired subroutine which is other than the first instruction of the subroutine, by storing an offset address into the temporary register along with the virtual instruction memory address of the subroutine. Accordingly, in step 230, when computing the physical memory address of the entry point into the desired subroutine in instruction memory 102, the PUSH routine adds the offset value stored in the temporary register by the calling routine, to the value IMEM_NR_BASE, to generate the actual entry point into the desired subroutine.

A similar process is performed where the desired subroutine is located in the permanent portion of the instruction memory. Specifically, if at step 220, it is determined that the desired subroutine is in the permanent portion of the instruction memory, then in step 232, the entry point into the subroutine is computed by adding the offset value stored in the temporary register by the calling routine, to the virtual instruction memory address for the subroutine, to generate the entry point into the desired subroutine.

Figure 4B:
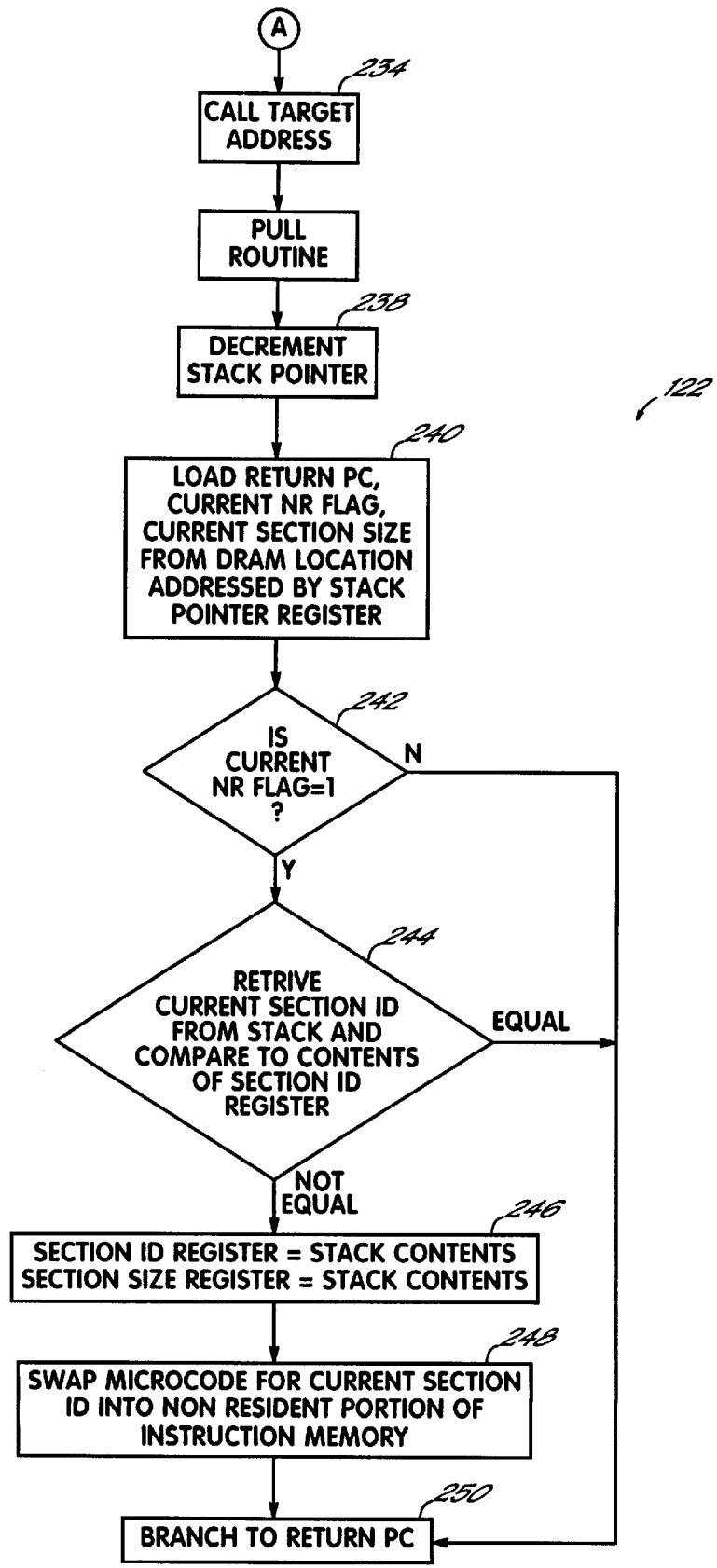
FIG. 4B is a flow chart of the virtual instruction memory and stack management routine included in the permanent storage area of the instruction memory of the RISC CPU illustrated in FIG. 1, and particularly the PULL routine portion thereof.

Referring now to FIG. 4B, after step 230 or 232, the physical instruction memory address of the entry point into the desired subroutine has been computed, and accordingly a CALL instruction is executed in step 234, causing the desired subroutine to begin executing at the desired entry point. As a result of the execution of this CALL instruction, the first instruction after the CALL instruction (i.e., the first instruction of the PULL routine) will be stored in the ReturnPC register 140. Thus, whenever any subroutine reaches its end, and executes a RETURN instruction, processing returns to the first instruction of the PULL routine.

In the first step 238 of the PULL routine, the stack pointer is decremented, and then in step 240, previously stored values are loaded from the stack. Specifically, the ReturnPC, NR flag, SectionSize and SectionID values previously stored on the stack are retrieved.

At this point, the PULL routine must determine, first, whether the ReturnPC value identifies a nonresident routine, or a subroutine in the permanent area of instruction memory 102. In the former situation, the PULL routine must ensure that the nonresident calling routine is in the nonresident portion of instruction memory 102, before processing can proceed.

Accordingly, in step 242, the PULL routine checks the NR flag retrieved from the stack. If the NR flag has a value of "1", this indicates that the calling routine is a nonresident routine. In this situation, it may be necessary to swap the calling routine into the nonresident portion of the instruction memory 102, before processing can proceed.

Accordingly, if the NR flag is "1" in step 242, in step 244, the PULL routine compares the current value of the SectionID register 132, to the SectionID value retrieved from the stack in step 240, thus determining whether the nonresident routine currently in the nonresident portion of instruction memory 102, which is identified by the SectionID register 132, is the nonresident calling routine which is identified by the SectionID value retrieved from the stack. If the two are equal, then it is not necessary to swap the nonresident calling routine into the instruction memory 102, since the routine is already in the nonresident area of instruction memory 102.

If, however, the SectionID value retrieved from the stack is not equal to the SectionID value in register 132, then the nonresident calling routine must be swapped into the nonresident area of the instruction memory. Accordingly, in this situation, the PULL routine proceeds from step 244 to step 246, in which the SectionID value retrieved from the stack is stored in the SectionID register 132, and the SectionSize value retrieved from the stack is stored in the SectionSize register 134. Then, in step 248, the instructions for the calling routine are swapped from DRAM into the nonresident portion of the instruction memory 102. Specifically, the RISC CPU delivers a command to the memory controller of the ASIC, to swap the number of 32-bit instructions identified by the SectionSize register, into the instruction memory 102 at locations starting at IMEM_NR_BASE, from DRAM 104, starting at the DRAM address which is equal to the virtual instruction memory address stored in the SectionID register, incremented by the offset value SYSBUF_UCODE_START. In response to this command, as described in detail by the above-referenced U.S. patent applications, the memory controller of the ASIC delivers SectionSize instructions to instruction memory 102, which are stored therein.

After step 248, the nonresident calling routine is stored in the nonresident portion of instruction memory 102. Accordingly, in step 250, the PULL routine executes a BRANCH instruction, causing program execution to sequence to the instruction identified by the ReturnPC register.

As noted above, the above steps only occur if the calling routine is a nonresident routine (as determined at step 242) and the nonresident calling routine is not current stored in the nonresident portion of instruction memory 102 (as determined at step 244). If the calling routine is in the permanent area of the instruction memory 102 (as determined at step 242), or if a nonresident calling routine is already stored in the nonresident portion of instruction memory 102 (as determined at step 246), then processing proceeds directly to step 250, bypassing the swapping steps 246 and 248. This bypass substantially reduces the latency associated with returning from called subroutines, in that nonresident routines are only swapped into the nonresident area of the instruction memory 102 when and if those routines are needed and are not already present in instruction memory 102.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, principles of the present invention may be applied to task and stack management in reduced instruction set central processing units used in applications other than digital video signal processing. Furthermore, principles of the present invention might be expanded, to permit multiple nonresident subroutines to be independently swapped into or out of a nonresident area of instruction memory 102. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of controlling a central processing unit connected to an off-chip memory, to provide management of a plurality of tasks to be performed by said central processing unit, comprising providing a register of said central processing unit for storing a plurality of binary task flags, each of said task flags being associated with one of said plurality of tasks, providing sequences of instructions in an on-chip instruction memory of said central processing unit and in an said off-chip memory, said sequences of instructions, when executed by said central processing unit, performing one of said plurality of tasks, repeatedly executing a task management procedure in said central processing unit, said task management procedure comprising the steps of determining whether any of said task flags is set, and if a flag is set determining whether a sequence of instructions associated with a set task flag is resident in said instruction memory, and if not, loading said sequence of instructions from said off-chip memory into said on-chip instruction memory, and executing the sequence of instructions associated with a set task flag.

2. The method of claim 1, wherein said task management procedure determines whether any of said task flags is set, by the steps of determining whether any of a group of said task flags is set, and if so, determining which specific task flag of said group is set.

3. The method of claim 2 wherein said task management procedure determines which specific task flag of a group is set by determining whether any of a first subgroup of task flags of said group is set, and if so, determining which specific task flag of said subgroup is set, otherwise, determining whether any of a second different subgroup of task flags of said group is set, and if so, determining which specific task flag of said subgroup is set.

4. The method of claim 2 wherein said task management procedure performs said determining step on two or more different groups of said task flags.

5. The method of claim 1, wherein, if multiple task flags are set during said task management procedure, said task management procedure selects a highest priority task of those tasks associated with set task flags, and executes said highest priority task.

6. The method of claim 1, further comprising responding to an interrupt signal delivered to said central processing unit, by executing an interrupt service routine, said interrupt service routine comprising the step of setting one of said task flags, to thereby cause subsequent execution of the sequence of instructions performing the associated task.

7. The method of claim 1, further comprising responding to an interrupt signal delivered to said central processing unit indicating need for execution of a time-critical task, by executing an interrupt service routine, said interrupt service routine comprising instructions for performing said time-critical task.

8. A central processing unit programmed to provide management of a plurality of tasks to be performed by said central processing unit, comprising a register storing a plurality of binary task flags, each of said task flags being associated with one of said plurality of tasks, sequences of instructions stored in an on-chip instruction memory of said central processing unit, said sequences of instructions, when executed by said central processing unit, performing one of said plurality of tasks, wherein said central processing unit repeatedly executes a task management procedure, comprising the steps of determining whether any of said task flags is set, and if a flag is set determining whether a sequence of instructions associated with a set task flag is resident in said on-chip instruction memory, and if not, loading said sequence of instructions from an off-chip memory into said on-chip instruction memory, and executing the sequence of instructions associated with a set task flag.

9. The central processing unit of claim 8, wherein during execution of said task management procedure, said central processing unit determines whether any of said task flags is set, by the steps of determining whether any of a group of said task flags is set, and if so, determining which specific task flag of said group is set.

10. The central processing unit of claim 9 wherein during execution of said task management procedure, said central processing unit determines which specific task flag of a group is set by determining whether any of a first subgroup of task flags of said group is set, and if so, determining which specific task flag of said subgroup is set, otherwise, determining whether any of a second different subgroup of task flags of said group is set, and if so, determining which specific task flag of said subgroup is set.

11. The central processing unit of claim 9 wherein during execution of said task management procedure said central processing unit performs said determining step on two or more different groups of said task flags.

12. The central processing unit of claim 8, wherein during execution of said task management procedure, if multiple task flags are set, said central processing unit selects a highest priority task of those tasks associated with set task flags, and executes said highest priority task.

13. The central processing unit of claim 8, wherein said central processing unit responds to an interrupt signal delivered to said central processing unit, by executing an interrupt service routine, said interrupt service routine comprising the step of setting one of said task flags, to thereby cause subsequent execution of the sequence of instructions performing the associated task.

14. The central processing unit of claim 8, wherein said central processing unit responds to an interrupt signal delivered to said central processing unit indicating need for execution of a time-critical task, by executing an interrupt service routine, said interrupt service routine comprising instructions for performing said time-critical task.

* * * * *

UNITED STATES PATENT AND TRADEMARK OFFICE
CERTIFICATE OF CORRECTION

PATENT NO. : 5,928,321

DATED : July 27, 1999

INVENTOR(S) : Ozcelik et al.

It is certified that error appears in the above-identified patent and that said Letters Patent is hereby corrected as shown below:

Column 7, line 14 reads "Fig. 31B." and should read --Fig. 3B.--

Signed and Sealed this

Twenty-fourth Day of October, 2000

Attest:

Q. TODD DICKINSON

*Attesting Officer*    *Director of Patents and Trademarks*